United States Patent [19]

Gauzan

[11] 4,242,755
[45] Dec. 30, 1980

[54] CIRCUIT ARRANGEMENT FOR DECODING DIGITAL SIGNALS

[75] Inventor: Pierre Gauzan, Paris, France

[73] Assignee: Thomson-CSF, Paris, France

[21] Appl. No.: 76,562

[22] Filed: Sep. 18, 1979

Related U.S. Application Data

[63] Continuation-in-part of Ser. No. 869,236, Jan. 13, 1978, abandoned.

[30] Foreign Application Priority Data

Jan. 14, 1977 [FR] France .............................. 77 01067

[51] Int. Cl.$^3$ .............................................. H04L 7/00
[52] U.S. Cl. .................................. 375/114; 375/116; 375/94; 375/95
[58] Field of Search ...................... 375/94, 95, 96, 116, 375/114, 113

[56] References Cited

U.S. PATENT DOCUMENTS

| | | | |
|---|---|---|---|
| 3,335,224 | 8/1967 | Meslener | 375/110 |
| 3,390,233 | 6/1968 | Brothman | 178/67 |
| 3,396,369 | 8/1968 | Brothman | 371/6 |
| 3,757,226 | 9/1973 | Stover | 375/76 |
| 3,908,084 | 9/1975 | Wiley | 375/117 |
| 3,920,900 | 11/1975 | Fineman | 375/118 |
| 3,961,138 | 1/1976 | Fellinger | 375/117 |
| 4,012,598 | 3/1977 | Wiley | 375/118 |
| 4,035,601 | 7/1977 | Isaacs | 375/116 |
| 4,130,724 | 12/1978 | Bousmar | 375/116 |

*Primary Examiner*—Benedict V. Safourek
*Assistant Examiner*—Michael Allen Masinick
*Attorney, Agent, or Firm*—Karl F. Ross

[57] ABSTRACT

A demodulator for binary messages of the diphase type comprises a sampling circuit controlled by a local clock whose cycle is approximately $1/n^{th}$ of the bit length of the incoming signals (with n = 8 in a specific instance), this circuit deriving (n−2) samples from each message bit which are then analyzed in a programmed memory to determine whether the bit being sampled has one of six acceptable configurations, namely a bit of logical value "0" or "1" in either a normal, a leading or a lagging position with reference to a decoding interval T equaling n clock cycles. If a different configuration is detected, an error signal is generated. The decoding interval is measured by a counter, stepped by the local clock, which is adjusted by recalibrating commands from the programmed memory to shorten or lengthen the next decoding interval when a bit is found to lead or lag by a full clock cycle, thereby restoring the normal relative time position of the message bits and the decoding interval. A validation signal emitted by the bit analyzer in the presence of an acceptable configuration enables the generation of a synchronization pulse at a predetermined time in the decoding interval to mark the instant at which the received message bit can be correctly read either in a reconstituted bit sequence or in the original binary pulse train delayed by one interval T of n clock cycles.

12 Claims, 6 Drawing Figures

CIRCUIT ARRANGEMENT FOR DECODING DIGITAL SIGNALS

CROSS-REFERENCE TO RELATED APPLICATION

This application is a continuation-in-part of my co-pending application Ser. No. 869,236 filed Jan. 13, 1978 (now abandoned).

FIELD OF THE INVENTION

The present invention relates to a circuit arrangement for demodulating digital signals which is intended particularly for use with a data-transmission system.

BACKGROUND OF THE INVENTION

Data-transmission techniques entail putting the message into digital form. When the original data are of an analog rather than digital nature, they are first subjected to processing by being sampled, quantized and coded to obtain the required digital form. The message is then represented by a series of symbols selected from a two-element alphabet designated by the numbers "0" and "1". The message undergoes a binary coding operation in which an electrical signal is assigned to each of the "0" and "1" symbols, these signals being generally termed "low" and "high", respectively. Direct coding can be performed by using, for example, non-return-to-zero (NRZ) coding known as full-baud coding, or again diphase or Manchester coding. The digital modulating signal so produced is generally transmitted on a carrier by using modulations of the carrier which are of the same type as for an analog signal. At reception, the demodulation consists in determining which of the possible amplitude, frequency or phase states of the carrier has been transmitted. The demodulating or decoding arrangement is adapted to the kind of coding performed at the transmission end and the clock signal which was used to time the coding operation has to be reconstituted to allow the "1" and "0" symbols of the message to be extracted.

The most widely used demodulating techniques are coherent demodulation, where a local oscillator synchronized with the transmission oscillator provides a phase reference and demodulation is performed by multiplying the incident signal with this reference waveform, and differential demodulation where the received signal, delayed by the length of one binary digit or bit, is used as the phase reference. The demodulation decodes the transitions in the signal directly.

Coherent demodulation enables a better performance to be achieved than differential demodulation; to obtain a synchronous time base, a phase-locking loop is used. In certain techniques of this kind the loop includes circuits for digitally quantizing phase errors.

In another technique which is used for decoding and identifying errors, described in U.S. Pat. No. 3,335,224, the signal is sampled in a shift register at a rate which is a multiple of, and preferably twice, the bit rate. This technique is intended particularly for transition-coded digital diphase signals. The recorded samples corresponding to at least two successive bits are decoded by using gate circuits to produce the bit information and to identify errors which there may be due to transmission noise.

OBJECT OF THE INVENTION

The general object of my present invention is to produce a circuit arrangement for demodulating binary signals which has a digital phase loop and which provides a high level of reliability without requiring an accurate local clock. A more particular object is to provide a demodulator of this character suitable for the processing of diphase-coded signals.

SUMMARY OF THE INVENTION

In accordance with my present invention, a demodulator for binary messages whose bits are distinguished by a characteristic phasing of two voltage levels, such as the aforementioned diphase or Manchester coding, comprises a signal generator, controlled by locally generated clock pulses with a cycle T1, for establishing a decoding interval T normally equaling n clock cycles T1, n being an integer equal to at least 3 (n=8 in the specific instance described hereinafter). Incoming message signals, with bits whose length T' approximately equals the coding interval T established by the signal generator, arrive at a sampling circuit which works into a bit analyzer. The analyzer, receiving a plurality of samples of an incoming message bit during each decoding interval in response to a transfer command from the signal generator, is programmed to distinguish between acceptable and nonacceptable configurations of bit samples and to discriminate among centered and off-centered acceptable configurations, emitting a validating signal in the presence of any acceptable configuration and a recalibrating command in the presence of an off-centered configuration. In response to such a recalibrating command, the signal generator alters the next decoding interval by one clock cycle T1 to re-establish a normal time position between the decoding interval and the following message bits. Circuitry controlled by the signal generator emits a synchronizing pulse in the presence of the validating signal, at a predetermined time in the corresponding decoding interval, to facilitate the correct reading of the respective bit either in the original binary pulse train, delayed by one normal interval T of n clock cycles, or in a reconstituted bit sequence as more fully described hereinafter.

The reconstituted bit sequence, replicating the incoming message bits to the extent that they are correctly received, may be carried out by logical circuitry such as a flip-flop connected to two outputs of a decoding circuit forming part of the bit analyzer in order to receive therefrom either of two bit-identifying pulses during each decoding interval in which an acceptable configuration of samples is detected. Other logical circuitry may be used to generate the aforementioned validating signal in the presence of either one of these bit-identifying pulses.

Pursuant to a more particular feature of my invention, the signal generator advantageously comprises a clock-pulse counter adjustable by a first or a second recalibrating command from the bit analyzer to shorten or to lengthen the next decoding interval to (n−1) clock cycles or (n+1) clock cycles, respectively, the first recalibrating command indicating a leading time position of the bit samples while the second one indicates a lagging time position of these samples with respect to their normal position in the decoding interval.

My improved demodulator may further comprise logical circuitry connected to the decoding circuit of the bit analyzer for generating a recognition pulse upon detecting a predetermined grouping of bit samples which constitute a synchronization code in an initial phase of message reception, that grouping including at least one special configuration (e.g. all-0 or all-1) acceptable only during this initial phase. A programmed memory in the bit analyzer, connected to the decoding circuit, responds to the recognition pulse by making this special code configuration unacceptable for the remaining duration of an incoming message.

BRIEF DESCRIPTION OF THE DRAWING

The above and other features of my invention will now be described in detail with reference to the accompanying drawing in which.

SPECIFIC DESCRIPTION

A demodulator according to the present invention performs a regular sampling operation on a binary message signal SB (FIG. 1) to be decoded in order to produce a predetermined number of samples during a decoding interval T approximately equaling the bit length of the signal. The sampling takes place under the timing of a local clock signal H. The period T1 (FIG. 2) of the local clock signal H is a fraction of the decoding interval or bit period T and thus of the length of a bit in the signal SB to be decoded and is dictated in particular by the number of samples required per bit period. The configuration of the binary sequence represented by the samples which are selected in the course of one decoding interval or bit period T makes it possible, by a suitable decoding operation, to determine whether a "0" or a "1" bit is involved. When performing this decoding operation, account is also taken of the configurations which the samples exhibit when they are subjected to a limited backward or forward shift from a midposition in which they are centered within the bit period concerned. The detected shifts are also used to generate an appropriate recalibrating signal so that the samples which are taken in the next period become substantially centered again.

The decoding operation also produces a validating or enabling signal which allows a local bit-synchronizing pulse HM to be produced when the bit is recognized and which prevents this synchronizing pulse from being emitted in the event of the bit not being recognized. Such synchronization is needed since, generally, the local clock signal H is out of phase with the clock signal used to time the outgoing signal at the transmitting end of the system.

Figure 1:
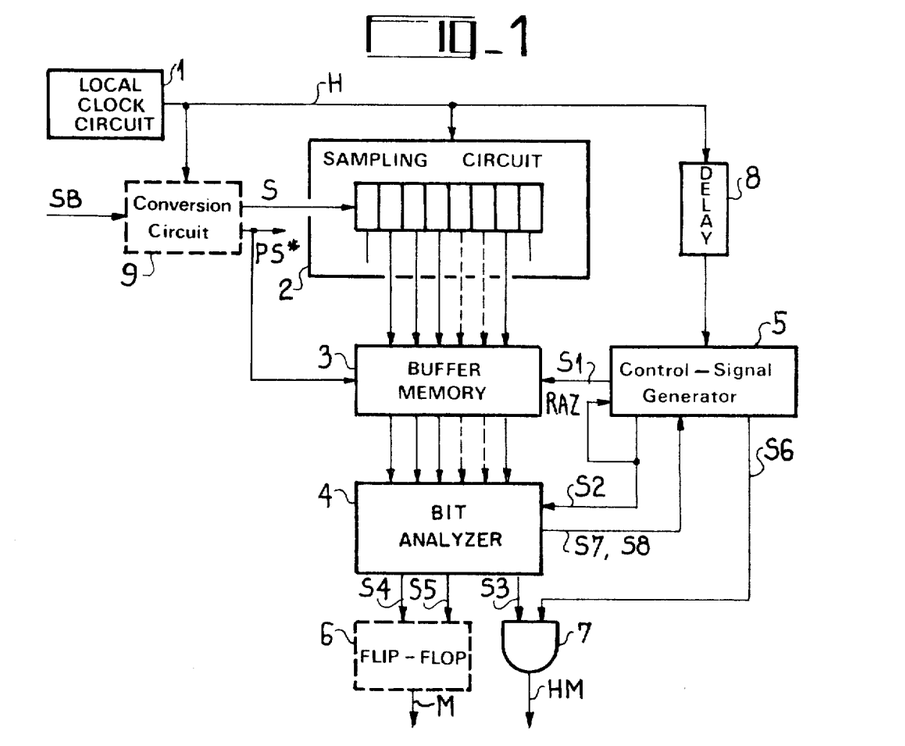
FIG. 1 is a simplified general diagram of a demodulating arrangement according to the invention.

The basic components of my improved demodulator are shown diagrammatically in the simplified block diagram of FIG. 1. They comprise a circuit 1 for generating the local clock signal H of period T1, a sampling circuit 2 receiving a binary signal S to be decoded which is derived (via an ancillary converter 9, if necessary) from the incoming signal SB and is assumed to take either of two levels "1" and "0", a buffer memory 3 for the temporary storage of the samples from circuit 2, a bit analyzer 4 serving to decode the various configurations to be recognized, and a circuit 5 which produces a signal S1 to control the readout of the samples from memory 3 and a signal S2 to control the decoding in circuit 4. The signals S1 and S2 are produced in succession toward the end of the sampling cycle and before the end of the bit period concerned. One output of decoder 4 emits a validating signal S3 in the event of a "1" or "0" bit being recognized by the decoding operation. Two output signals S4 and S5 from the decoder correspond respectively to a "1" and a "0" bit being identified. They may be applied to an ancillary circuit 6 in the form of a flip-flop generating a binary signal M of the NRZ type to be reconstituted. An output signal S6 of control circuit 5 enables, when the validating signal S3 is present, generation of the local bit-synchronizing signal HM in the output of an AND gate 7. Finally, when required, a recalibrating command S7 or S8 causes the control signals S1 and S2 to be shifted forward or backward in time in the course of the next period. The shift produced by this loop corresponds to one cycle T1 of the clock signal H. The block 8 represents a delay circuit designed to synchronize the control circuit 5 with the sampling circuit 2, with an intervening time lag.

Figure 2:
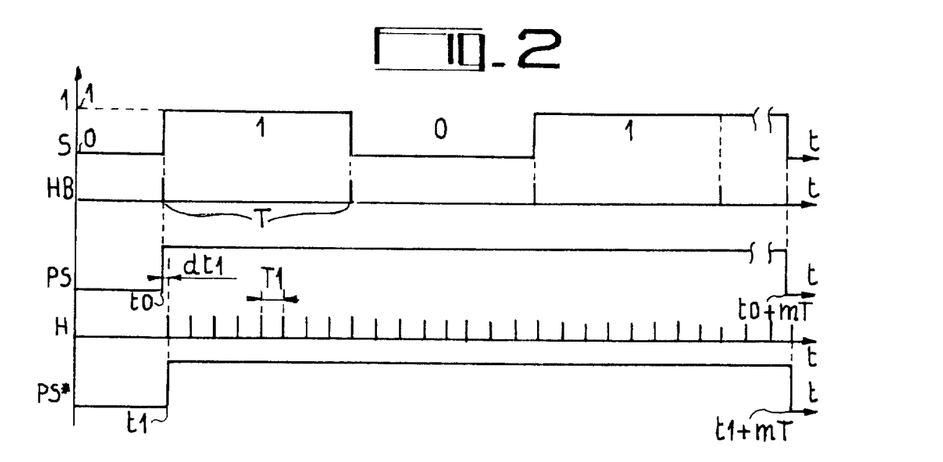
FIGS. 2 to 4 show waveforms of data signals to be processed, clock signals and control signals.

The signals indicated in FIG. 2 represent, in succession, the binary message signal S to be decoded, such as an NRZ signal of which the first three bits of respective logical values "1", "0", "1" are shown; the bit-timing signal HB corresponding to signal S; a duration signal PS formed by a pulse whose leading edge marks the time t0 at which the message signal S begins and whose trailing edge marks the time of its end, which may be expressed as t0+mT, m being the number of bit periods contained in the signal S to be decoded; and the local clock signal H of period T1=T/n to produce n samples per period T. The first pulse of signal H is displaced relative to time t0 by dt1; this displacement dt1 is zero in some cases, namely where the phases of signals HB and H happen to coincide in time, but generally lies in the range 0 to T/n. A shift-compensated duration signal PS* corresponds to signal PS when synchronized with signal H and is used for resetting the various circuits in the demodulator to their initial state at the beginning of reception.

With the help of the reconstituted bit-synchronizing signal HM, FIG. 1, the "1"-bit discriminating signal (S4) and the "0"-bit discriminating signal (S5) enable the "1" and "0" bits in the message to be identified.

Figure 3:
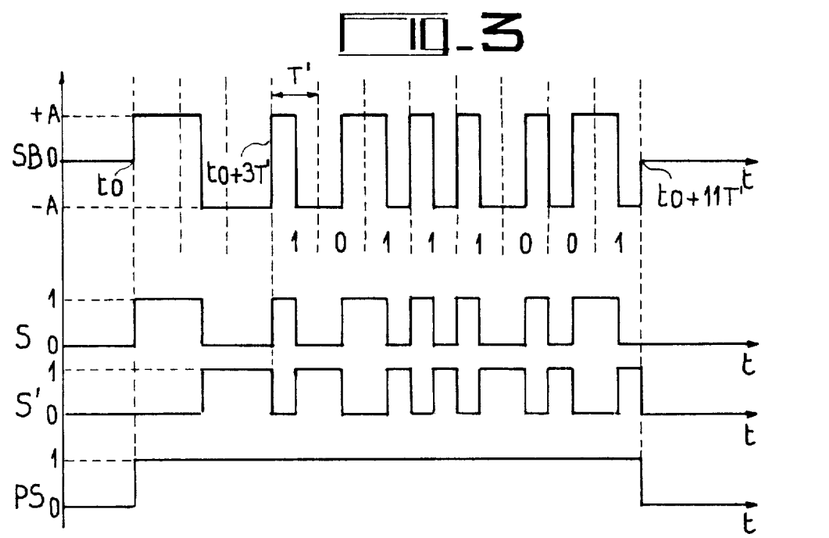
Figure 4:
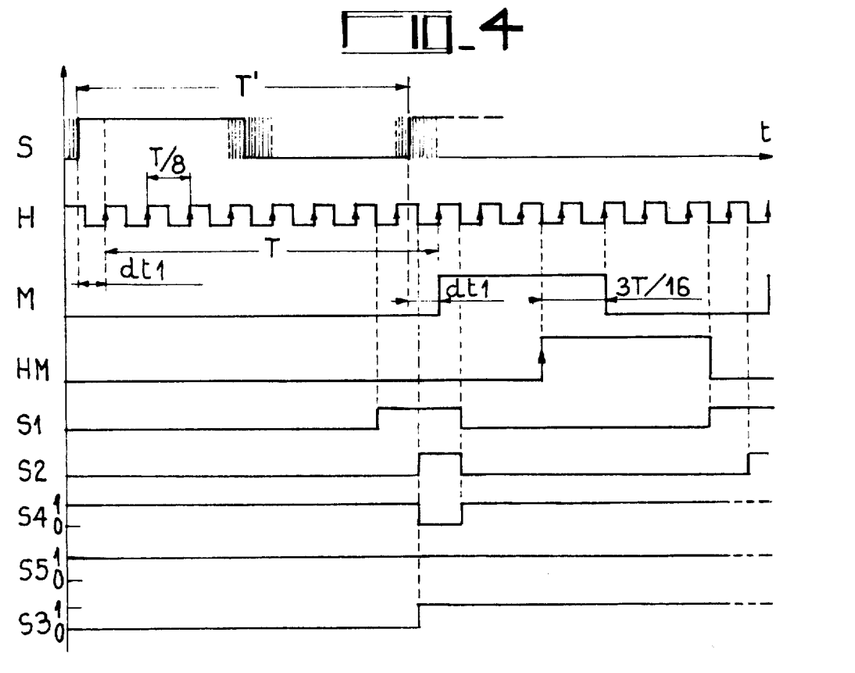
Figure 5:
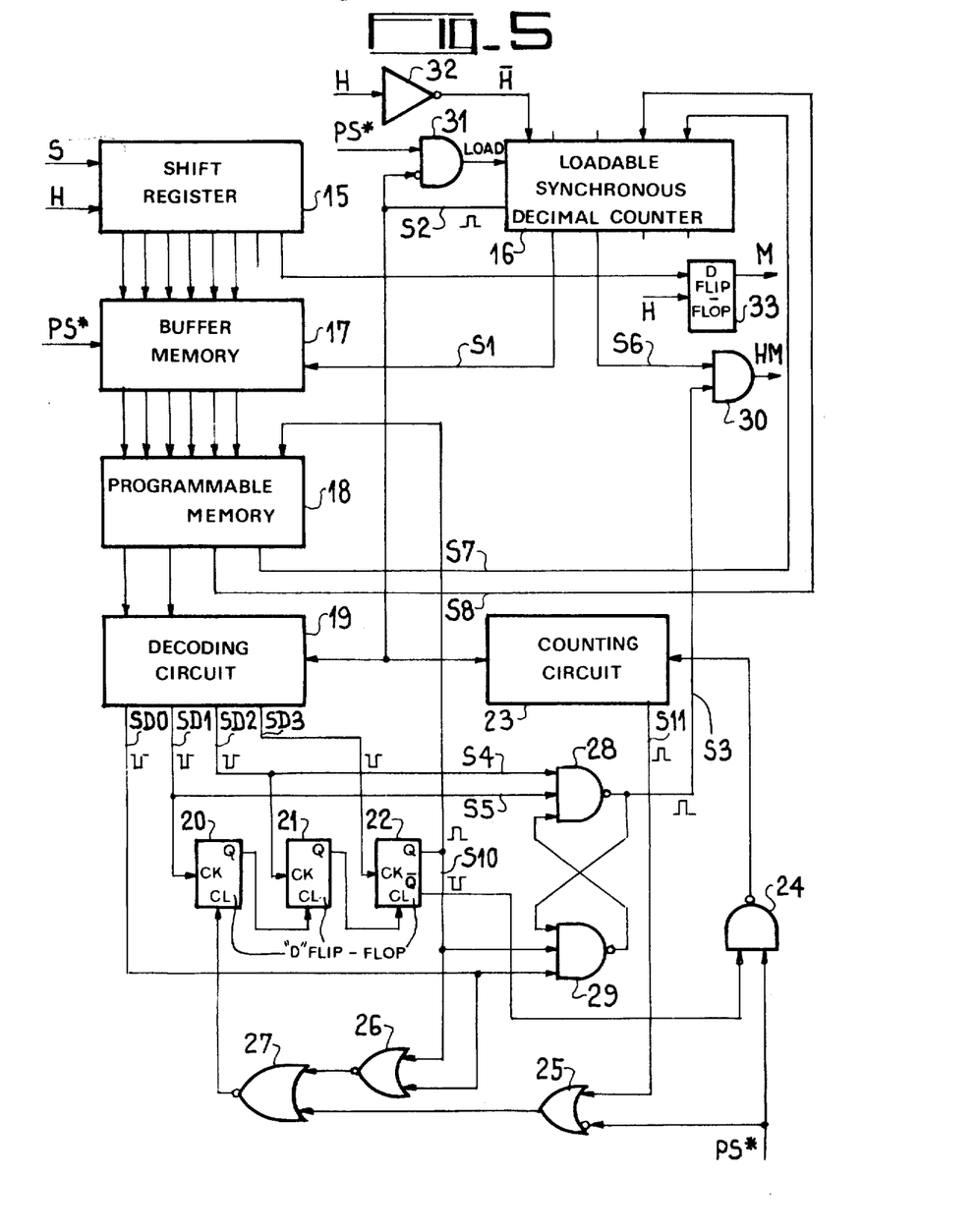
FIG. 5 shows details of an embodiment of my invention similar to that shown in FIG. 1.

The following description, which refers to FIGS. 3 to 5, deals with the case of a Manchester-coded signal SB, also referred to as a diphase-coded signal. The message concerned is represented by signal SB in FIG. 3. The diphase code is particularly useful since it does not call for the DC component to be transmitted, which is sometimes a nuisance. The two symbols "0" and "1" are represented by the phases 0 and $\pi$ of a square wave whose period T' represents the bit length. The example selected is not meant to limit my invention but will give a good understanding of the method employed and of the operation of the improved demodulator; as will be seen from the description, the method can be readily applied to some other binary code whose bits are distinguished by a characteristic phasing of two signal levels. In the message SB shown in FIG. 3, which is restricted to eight bits for the sake of simplicity, there is a first part extending from time t0 to time t0+3T' which forms a preamble of length 3T' representing a synchronizing code which, on decoding, establishes the beginning of the message. The part downstream of the time t0+3T', at which the preamble ends, constitutes the transmitted message proper which is formed in the present case by the diphase-coded binary sequence 10111001.

Diphase coding involves three levels, namely the zero level, which means no message, and the levels +A and −A occurring during the message, together with the corresponding transitions. Since the mean voltage is zero, this code is particularly well suited to the transfer of messages along bus lines.

By way of example, the synchronizing code shown is assumed to be formed by the diphase coding for a "1" bit spread over a time equal to 3T'.

The signal SB which is shown cannot be used directly in a digital processing circuit using binary logic since it contains three levels +A, 0 and −A. The conversion of such a signal so that it is on two levels is performed in the ancillary circuit 9 (FIG. 1). This conversion may involve a double-threshold comparison to produce the signals S and S' in FIG. 3. Signal S corresponds to the top part of the diphase-coded signal SB and signal S' corresponds to an inversion of its lower part. If the two signals S and S' are added complementarily, they yield the duration signal or message-length pulse PS already referred to in connection with FIG. 2. By means of logical circuitry including a flip-flop, the duration signal PS is converted into the aforedescribed signal PS* in step with the local clock signal H (FIG. 2); thus, with the aid of suitable coincidence gates, the flip-flop may be set by the first clock pulse occurring upon the appearance of signal PS and may be reset by the first clock pulse occurring upon the disappearance of that signal. Signals S and PS* are used for decoding in place of signal SB.

The demodulator shown in FIG. 5 supplies a message signal M and a timing or bit-synchronizing signal HM which enables the "0" and "1" symbols of the message to be reliably extracted from the signal M for further use.

To ensure that the sequencing is correct, the demodulator of FIG. 5 uses a local clock signal H whose frequency is about n times the bit cadence 1/T' of signal S. The calibration of this clock signal does not have to be very accurate and the permitted tolerance may be large, being ±10% in the case considered where n=8. The clock signal H is shown as a square wave in FIG. 4, with rising edges representing the pulses of FIG. 2.

The sampling circuit 2 of FIG. 1 is represented in FIG. 5 by an eight-bit shift register 15 which is synchronized by signal H to read out successive samples of signal S (FIG. 3) in parallel. The parallelization is triggered by the rising edges of the clock signal H and this corresponds to the taking of eight samples of signal S at successive times T/8 apart.

Of the eight samples only six are used. The samples in the serial positions No. 1 and No. 8 which correspond respectively to the first and eighth samples are eliminated since it is not certain that they do not derive from the previous or the succeeding period of the message if the phase difference dt1 between the locally generated clock signal H and the bit timing is very close to its extreme values of 0 and T/8. Six samples therefore remain and these are used to validate or not to validate the bit concerned; depending on whether it is the synchronizing code or the message proper which is concerned, the six-bit word formed by the six samples may have the following different configurations. In the case of the first part of the synchronization code or preamble lasting from t0 to t0+T', the word is 111111. In the case of the second part (middle third) of the synchronization code or in the case of a "1" bit in the message, the binary configuration is 111000. In the case of the third part of the synchronization code the configuration is 000000 and, finally, in the case of a "0" bit in the message the configuration is 000111. If other combinations are detected, they indicate faulty modulation, which will result in a corresponding suspension of decoding, or that the clock signal H is out of step with the signal S to be decoded. The deviation of the clock signal H will automatically be corrected so that the demodulator will tend each time to sample one of the predetermined configurations described above.

Aside from shift register 15, stepped by the rising edges of signal H, the other circuits of the arrangement are synchronized by the descending edges of this clock signal to make allowance for the lengths of time required by the various circuits to perform successive operations and especially the time required by a loadable synchronous decimal counter 16 which is presettable to count to 7, 8 or 9 as called for by the operational requirements involved. The delay is obtained by inverting signal H at 32. The counting circuit 16 is thus synchronized by an inverted clock signal $\overline{H}$ with an offset of T/16 from clock signal H.

As soon as signal PS* is found to be present, it is applied to a starting terminal (LOAD) of counter 16 and the latter then begins to count. At the seventh counting step (see FIG. 4) an analysis of the six samples collected, which in theory are centered within the bit period concerned, takes place as a result of their transfer to a buffer memory 17 (corresponding to circuit 3 of FIG. 1) in response to the aforementioned control signal S1 emitted by the counter. Decoding is ordered at the next clock period H by signal S2 also emitted by counter 16. As long as the synchronizing code has not been recognized, decoding is inhibited. The bit analyzer of FIG. 5, corresponding to circuit 4 of FIG. 1, comprises a programmable memory 18 and a decoding circuit 19 which has four outputs marked SD0, SD1, SD2 and SD3. These outputs are normally at the "1" level and go to the "0" state when the following configurations are detected:

SD1—first part of synchronization code (111111) and "0" bit of the following message (000111), SD2—second part of synchronization code and "1" bit of the following message (111000), SD3—third part of synchronization code (000000), SD0—faulty synchronization or improper bit, i.e. no synchro or message bit identified.

When the synchronizing code is recognized, the message is examined, recognition of the code meaning that the first three decoding operations produce signals at SD1, SD2 and SD3 in that order. If this order is not observed, if decoder output SD0 is activated (i.e. goes from high to low) or if the synchronizing code has still not been recognized by the fourth decoding operation, decoding is interrupted until the next message.

To recognize the synchronizing code, use is made of three D-type flip-flop circuits 20, 21 and 22, a counter 23 which counts to four, and gate circuits 24 and 27. The outputs SD1 to SD3 are connected to the trigger or clock inputs CK of flip-flops 20 to 22, respectively. The Q or set output of flip-flop 20 is connected to the resetting or clearing input CL of flip-flop 21 and a like connection exists between flip-flops 21 and 22. The Q output of the third flip-flop 22 emits a "synchro recognized" pulse S10. This pulse is applied to memory 18 as an instruction that only the configurations for "0" and "1" bits of the message be recognized from this moment on; thus, a bit combination 000000 received thereafter is translated by the memory into one giving rise to error signal SD0. Another flip-flop circuit is formed by two NAND gates 28 and 29; the output S3 of the normally non-conductive gate 28, with inputs connected to the output of gate 29 and to leads SD1, SD2, changes from "0" to "1" in response to a "0" level on either of these leads after flip-flop 22 has been set and emits the signal S10.

The synchronized duration signal PS* activates the counter 23 at instant t0 via NAND gate 24 and makes the flip-flop 20 responsive to "0" level on lead SD1 by energizing, via cascaded OR and NOR gates 25 and 27, the input CL of that flip-flop. The resulting setting of flip-flop 20 energizes the input CL of flip-flop 21 which, in response to a subsequent "0" level on lead SD2, causes a similar reversal of flip-flop 22 if lead SD3 goes to "0" level before counter 23 has taken four steps in response to the signal S2 occurring between the eighth and last sample in a bit period T and the first sample in the next bit period, as seen in FIG. 4. A "0" level on decoder output SD0, energization of an output S11 of the counter 23 when it has counted to four, or the disappearance of signal PS* resets the flip-flops 20, 21 and 22 until the next message. Via NAND gate 24, a low level on the reset or $\overline{Q}$ output of flip-flop 22 in the presence of recognition signal S10 deactivates the counter 23 until the next message. Once the synchronization code has been recognized, and with bit combination 000000 no longer arriving from memory 18, the code detector 19 does not emit any further signals from its output SD3 and only the outputs SD1 and SD2, respectively generating the "1"-bit and "0"-bit identifications S4 and S5 (FIG. 1), as well as the error-indicating output SD0 are used.

The loadable synchronous decimal counter 16 is stepped on the leading edge of a pulse $\overline{H}$ and its count can be set as desired between 1 and 10, depending on the value loaded into the counter before its activation. The counter 16 is normally set to an initial count of 2 by output signals S7=0 and S8=1 of memory 18. Its output signal S6 goes to "1" when a count of four is reached, i.e. at the third step, and via an AND gate 30 the signal S6 forms the signal HM when the enabling signal S3 is high. Output S1 of clock-pulse counter 16 goes to "1" when a count of eight is reached, i.e. at the seventh step, and causes the values stored in the first six stages of register 15 to be transferred to memory 17. The samples involved are thus indeed those in serial positions Nos. 2 to 7 for the bit period concerned. At the eighth counting step, corresponding to a count of 9, the transfer command S2 appears at the carry output of the counter 16. This signal S2 follows by one clock cycle the start of the transfer command S1 and controls the decoding circuit 19 as well as the interval counter 23, the latter responding to signal S2 only during the phase of recognition of the synchronization code. Signal S2 is also applied, with the appropriate polarity, to the LOAD input of counter 16 via an AND gate 31 unblocked by signal PS*. AND gate 30 of FIG. 5 corresponds to gate 7 of FIG. 1.

As indicated in FIG. 1, the bit-identifying pulses S4 and S5 may be applied to flip-flop 6 to form a binary NRZ signal M corresponding to message S. Another possibility, illustrated in FIG. 5, is to use the output from the register 15 and apply it to a D-type flip-flop 33, which in fact forms a ninth register stage, to emit a signal M which lags by one period T the signal fed to the first stage of register 15. Moreover, as can be seen from the phase diagram of FIG. 4, the leading edge of the bit-synchronizing signal HM is 3T/16 or 1½ clock cycles T1 in advance of the transition of the message bit concerned, which is present in signal M, and signal HM thus allows the "1" or "0" symbol of the diphase-coded bit to be read directly.

If it is assumed that the frequency of the clock signal H is not and/or does not remain absolutely equal to n times the bit cadence 1/T' of the incoming message signal, repeated displacements will occur until the configurations 111000 ("1" bit) and 000111 ("0" bit) are no longer detected. In the case of a "1" bit the binary configuration will become 111100 or 110000, depending on the direction of the displacement, whereas in the case of a "0" bit it will become 000011 or 001111. To correct the decentralization of the samples, the memory 18 is programmed in such a way as to recognize the above four off-center configurations as acceptable and to transmit the appropriate "1" or "0" bit identification to the decoding circuit 19. In addition, the outputs S7 and S8 are used to lock the phase in the following manner: if the configuration 110000 or 001111 occurs, output S7 changes to "1" and output S8 is kept at "1", thus setting counter 16 to an initial count of 3. If configuration 111100 or 000011 occurs, output S7 goes to "1" and output S8 goes to "0", thus setting the counter to an initial count of 1. In the first case the clock signal H is lagging with respect to the bit period of message signal S and the counter will count to seven rather than eight. In the second case the clock signal H leads the message signal and the counter will count to nine. In both cases the loop allows an adjustment to be made in the requisite shift direction so as substantially to maintain the coincidence between the bit timing and the local clock signal H in order that the centralized values 111000 and 000111 can be decoded.

It should be mentioned that the correction which is made is reflected in signal HM and that the latter maintains a constant time position relative to signal M (FIG. 4).

The demodulator described with reference to FIGS. 3 to 5 may be produced from integrated logic circuits which are selected to suit, in particular, the planned operating frequency T/n. By way of example, it is possible to operate at 16 MHz with conventional TTL circuits. To produce an embodiment as shown in FIG. 5, the principal circuits may consist for example of a HARRIS HM7611 memory 18, a TEXAS SN74155 decoder 19, a TEXAS SN74174 buffer memory 17, a TEXAS SN74162 loadable synchronous decimal counter 16, a TEXAS 74164 eight-bit register 15, and TEXAS SN7474 D-type flip-flops 20, 21, 22, 23.

It may be pointed out that the larger the number n of samples used, the greater the accuracy with which the local clock signal is calibrated and the greater does the reliability of the arrangement become. On the other hand, the complexity of the arrangement increases with n. A compromise, therefore, has to be accepted in practice.

It may also be noted that the demodulator according to my invention is able to operate with n samples being analyzed in each period, but the number of configurations programmed in the memory of analyzer 18, 19 will be larger, given the ambiguity of the terminal samples when there are coincidences with transitions in the signal. In view of this ambiguity, the minimum value for the parameter n cannot be less than three samples, this entailing the least accurate calibration as a corollary. In addition, it can be seen that the end samples give scarcely any information on the calibration of the clock signal and there is therefore no point in using them, even in the case of a simple code of the NRZ type.

It must also be remembered that my improved demodulator is intended to be applicable to binary codes other than the diphase Manchester code envisaged. In effect, it is always possible to convert a binary code signal SB into a two-level signal S and a pulse PS, as shown in FIG. 3. The circuits will be designed to suit, in particular, the configurations to be identified and thus the positions of the transitions in signal S. The circuit arrangement will also be influenced by the synchronizing code employed, it being understood that this code is spread over a whole number of bit periods.

The fact that the calibration of the local clock signal is monitored and that if need be it can be shifted toward or back by one clock cycle T/n to rectify any error allows a local time base (1, FIG. 1) of only moderate accuracy to be used whose frequency is of the order of T'/n with a tolerance which may be large, e.g. ±10%, and on the other hand, though to a lesser degree, it does away with the need for a highly accurate bit-timing signal at the transmission end.

Figure 6:
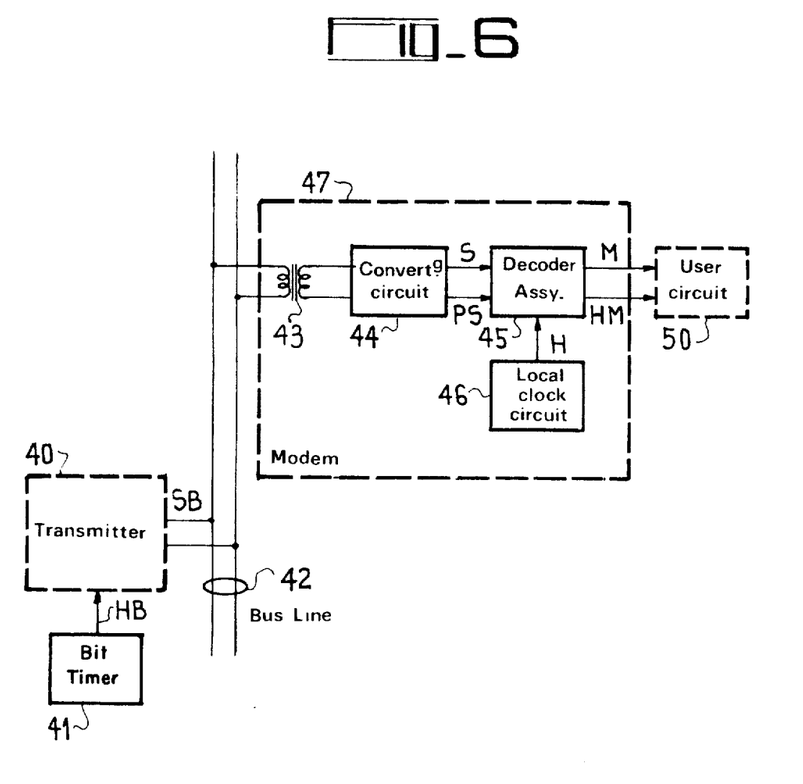
FIG. 6 is a block diagram of a demodulator according to my invention as applied to a system for transmitting data by means of a two-wire bus line.

FIG. 6 shows an application of my invention to a data-transmission system. A transmitter 40 emits a coded signal SB under the control of a clock signal HB produced by a bit timer 41. The message signal SB is transmitted via a two-wire bus line 42 to a modem circuit 47 which includes a demodulator according to the invention. The modem comprises an input transformer 43, a converting circuit 44 (corresponding to converter 9 of FIG. 1) to produce the signals S and PS, and a decoder 45 together with its local clock generator 46. The signals M and HM are transmitted to an associated user circuit 50 such as a microprocessor.

I claim:

1. A demodulator for binary message signals with bits distinguished by a characteristic phasing of two voltage levels, comprising:
    local timing means for establishing a train of clock pulses with a cycle T1;
    signal-generating means controlled by said clock pulses to establish a decoding interval T normally equaling n clock cycles T1 where n is an integer equal to at least 3;
    sampling means connected to receive incoming message signals with bits whose length T' approximately equals said decoding interval T and to derive a plurality of samples from each of said bits;
    bit-analyzing means connected to said sampling means for receiving therefrom at least some of the samples of an incoming message bit during each decoding interval in response to a transfer command from said signal-generating means, said bit-analyzing means being programmed to distinguish between predetermined acceptable configurations of bit samples and nonacceptable configurations differing therefrom and to discriminate among centered and off-centered acceptable configurations, with emission of a validating signal in the presence of any acceptable configuration and of a recalibration command in the presence of an off-centered configuration, said signal-generating means being responsive to said recalibrating command for altering the next decoding interval by one clock cycle T1 to re-establish a normal time position between said decoding interval and the following message bits; and
    circuit means connected to said bit-analyzing means for receiving said validating signal therefrom and controlled by said signal-generating means for emitting a synchronizing pulse, in the presence of said validating signal, at a predetermined time in each decoding interval.

2. A demodulator as defined in claim 1 wherein said signal-generating means comprises a clock-pulse counter receptive to a first recalibrating command for shortening the next decoding interval to (n-1) clock cycles in the event of a leading time position of said bit samples and to a second recalibrating command for lengthening the next decoding interval to (n+1) clock cycles in the event of a lagging time position of said bit samples.

3. A demodulator as defined in claim 2 wherein said clock-pulse counter has loading inputs connected to receive said first and second recalibration commands for establishing different initial counts.

4. A demodulator as defined in claim 1, 2 or 3 wherein said sampling means comprises an n-stage shift register and a buffer memory connected to receive from said shift register the voltage levels stored in the stages thereof with the exception of at least the first and the last voltage level sampled during a normal decoding interval of n clock cycles.

5. A demodulator as defined in claim 4 wherein said bit-analyzing means comprises a programmed memory connected to said buffer memory and a decoding circuit connected to said programmed memory for producing said validating signal in the presence of an acceptable configuration and for emitting an error signal in the presence of an unacceptable configuration.

6. A demodulator as defined in claim 5 wherein said decoding circuit is provided with two outputs carrying respective bit-identifying pulses in the presence of acceptable configurations corresponding to different voltage levels.

7. A demodulator as defined in claim 6, further comprising logical circuitry connected to said outputs for reconstituting said incoming message signals from said bit-identifying pulses.

8. A demodulator as defined in claim 6, further comprising logical circuitry connected to said outputs for generating said validating signal in the presence of either of said bit-identifying pulses.

9. A demodulator as defined in claim 5, further comprising logical circuitry connected to said decoding circuit for generating a recognition pulse upon detecting a predetermined grouping of bit samples constituting a synchronization code in an initial phase of message reception, said grouping including at least one special configuration acceptable only during said initial phase, said programmed memory being responsive to said recognition pulse for making said special configuration unacceptable for the remaining duration of an incoming message.

10. A demodulator as defined in claim 9, further comprising conversion means connected to receive said incoming message signals for deriving therefrom a duration signal terminating at the end of said message, said logical circuitry being responsive to said duration signal for detecting said grouping only in said initial phase.

11. A demodulator as defined in claim 4, further comprising logical circuitry forming an $(n+1)^{th}$ stage for said shift register for emitting, under the control of said signal-generating means, a sequence of incoming bits delayed by n clock cycles in a predetermined time position relative to said synchronizing pulse.

12. In combination, a transmitter generating a diphase-coded binary message and a receiver including a demodulator as defined in claim 1, 2 or 3 linked with said transmitter by a two-wire line, said transmitter comprising a bit timer independent of said signal-generating means.

* * * * *